F. WATKINS.
Machine for Tapping Nuts.
No. 45,110. Patented Nov. 15, 1864.
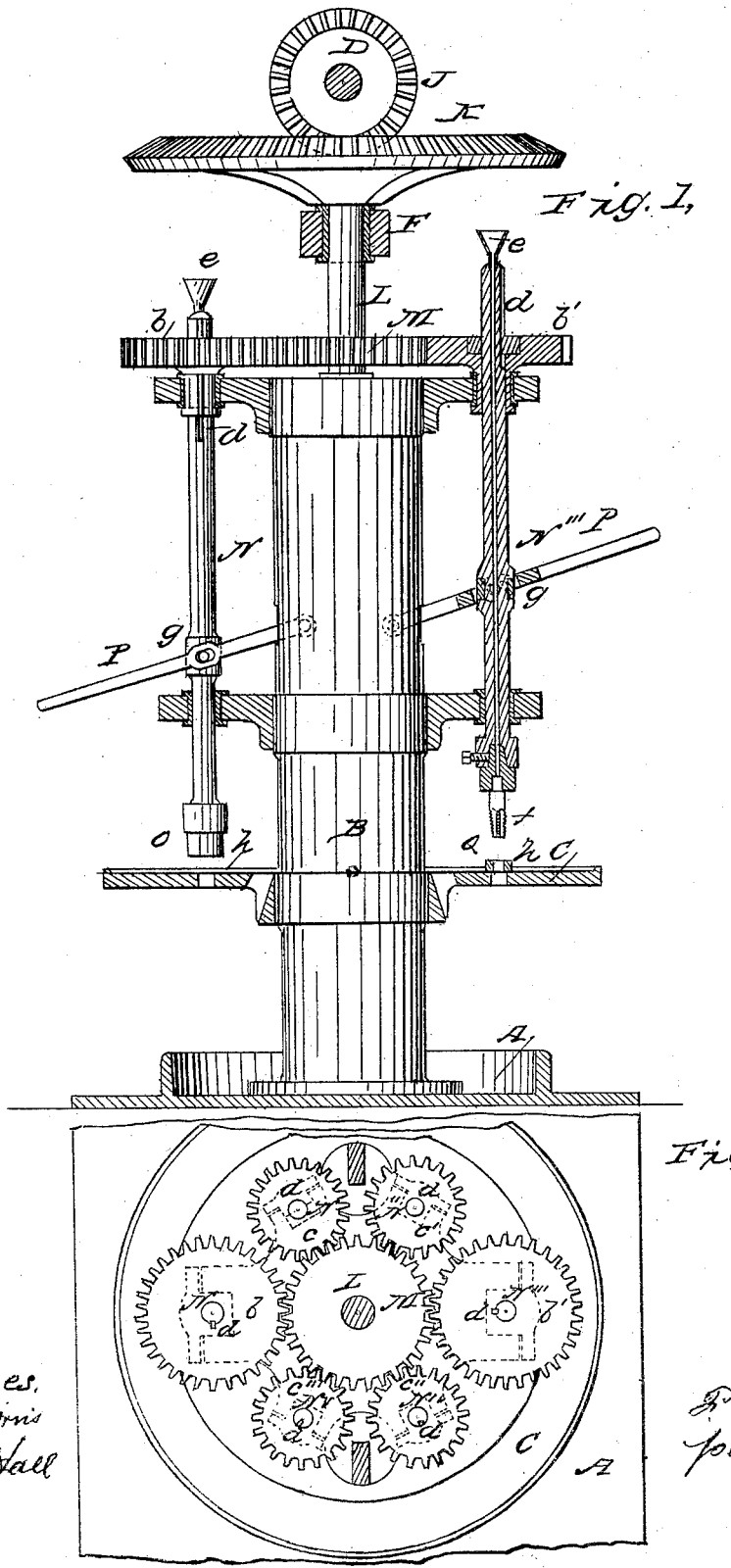

UNITED STATES PATENT OFFICE.

F. WATKINS, OF LONDON WORKS, BIRMINGHAM, ENGLAND.

MACHINE FOR TAPPING NUTS.

Specification forming part of Letters Patent No. 45,110, dated November 15, 1864.

*To all whom it may concern:*

Be it known that I, F. WATKINS, "London Works," Birmingham, England, have invented a new and Improved Tapping-Machine; and I do hereby declare that the following is a full, clear, and exact description thereof, which will enable others skilled in the art to make and use the same, reference being had to the accompanying drawings, forming part of this specification, in which—

Figure 1 represents a sectional side elevation of this invention. Fig. 2 is a sectional plan or top view of the same.

Similar letters of reference indicate like parts.

The object of this invention is to group a series of revolving sliding spindles around an upright driving-shaft so that a number of operatives may work simultaneously at one and the same machine. The different spindles are geared up, so that they rotate at different velocities, according to the class of work to be performed by each of them, and they are perforated by longitudinal central channels, through which oil, soap-suds, or other lubricating substance can be readily introduced.

A represents the main bed-plate of this machine, which may rest upon and be secured to any suitable foundation. Said bed-plate is provided with a circular flange formed upon its upper surface, as clearly shown in Fig. 2 of the drawings, which serves to collect and retain all the chips and liquid dropping from the machine. The pedestal or column B is fitted and secured to the center of the bedplate A, and constitutes the frame-work of the machine.

The circular table C, which is fixed to the column B at the required height, serves the double purpose of making a bed to which the clamps for holding the nuts are secured and also as a protection to the operatives.

D is the counter-shaft of the machine, and receives its motion through tight and loose pulleys in the usual manner. This motion is transmitted to the main upright shaft L by the unequal bevel-gears J and K, which are so proportioned that the motion of the shaft L is slow and powerful, and said shaft has its upper bearing in the bracket F and the lower bearing in the column B.

The spur-wheel M, which is firmly secured to the top of the upright shaft L and gears into the corresponding spur-wheels, $b$ $b'$ and $c$ $c'$ $c''$ $c'''$, gives motion to the various spindles N N' N'' N''' N$^{iv}$ N$^{v}$. These spindles pass through the spur-wheels, $b$ $b'$ $c$ $c'$ $c''$ $c'''$, and, being secured by the feathers $d$, revolve with them, but at the same time are permitted to rise and fall without hinderance. Each of the spindles has a funnel, $e$, at its upper end communicating with a channel passing through its center the entire length, a chuck or socket, $o$, at its lower end to receive the taps $f$, and a loose collar, $g$, at or near its center, to which the hand-levers P are attached, by which the said spindles may be raised or lowered, at the pleasure of the operator.

Q is the nut to be operated upon, and $h$ $h'$ are jaws or ribs secured to the table C to hold the nuts in place and prevent their revolving with the taps.

The operation is as follows: The machine being put in motion, and the hand-levers P raised, the blanks for the nuts are inserted between the jaws $h$ $h'$ and the taps placed in the chucks $o$, so that when the hand-levers are loosened the heft of the handles and spindles bring the taps on the nuts, and, as the taps revolve, they are screwed completely through the nuts and drop out below. The lubricant, being conveyed in any convenient manner to the funnels $e$, flows down through the spindles and chucks and around the shanks of the taps, which fit loosely in the chucks, thus supplying the taps in the most direct manner with a constant stream of the lubricating-substance used to keep the taps cool and to facilitate the cutting operation.

The spindles N N''', which carry the wheels $b$ $b'$, are stouter than the other spindles, and the wheels $b$ $b'$ are larger than the wheels $c$ $c'$ $c''$ $c'''$ to accommodate the same to different kinds of work; and it is obvious that the number of spindles grouped round the central shaft, L, and the size of the several wheels can be varied to suit convenience.

Having thus described my invention, I claim as new and desire to secure by Letters Patent—

1. Grouping six or more revolving sliding spindles around an upright driving-shaft, the said shaft giving motion to the spindles and taps which they carry, in combination with the levers P, all constructed and arranged as described.

2. In combination with the subject-matter of the above, so proportioning the gearing between the driving-shaft and the various spindles, that two or more spindles will be driven at different rates of speed and with greater or less power, so as to adapt the machine for different classes of work.

F. WATKINS.

Witnesses:
J. M. G. UNDERHILL,
   *Consular Agent, U. S.*
JAMES H. ROUS,
   *Clerk to the said J. M. G. Underhill.*